US006686431B2

(12) United States Patent
Barker et al.

(10) Patent No.: US 6,686,431 B2
(45) Date of Patent: Feb. 3, 2004

(54) OPTICAL COATING HAVING LOW REFRACTIVE INDEX

(75) Inventors: H. Paul Barker, Sherman Oaks, CA (US); Eng Pi Chang, Arcadia, CA (US); Daniel Holguin, Fullerton, CA (US)

(73) Assignee: Avery Dennison Corporation, Pasadena, CA (US)

( * ) Notice: Subject to any disclaimer, the term of this patent is extended or adjusted under 35 U.S.C. 154(b) by 98 days.

(21) Appl. No.: 10/057,153

(22) Filed: Oct. 25, 2001

(65) Prior Publication Data

US 2003/0105180 A1 Jun. 5, 2003

Related U.S. Application Data

(60) Provisional application No. 60/245,326, filed on Nov. 1, 2000.

(51) Int. Cl.$^7$ ............................................. C08F 222/10
(52) U.S. Cl. ................... 526/325; 526/208; 526/303.1; 526/320; 526/321; 526/333
(58) Field of Search .................. 526/208, 303.1, 526/320, 321, 325, 333

(56) References Cited

U.S. PATENT DOCUMENTS

| 2,976,576 A | | 3/1961 | Wichterle et al. ............... 18/58 |
|---|---|---|---|
| 3,419,006 A | | 12/1968 | King ............................ 128/268 |
| 3,458,348 A | * | 7/1969 | Sherman ................... 117/138.8 |
| 3,963,685 A | | 6/1976 | Abrahams ..................... 526/230 |
| 3,963,805 A | | 6/1976 | Chu ............................. 260/874 |
| 4,143,949 A | * | 3/1979 | Chen ........................ 351/160 H |
| 4,224,427 A | * | 9/1980 | Mueller et al. ................. 526/93 |
| 4,258,715 A | | 3/1981 | Goble .......................... 128/283 |
| 4,605,608 A | | 8/1986 | Bullitt ......................... 430/206 |
| 4,802,997 A | * | 2/1989 | Fox et al. ...................... 252/8.6 |
| 4,871,785 A | * | 10/1989 | Froix .......................... 523/106 |
| 4,914,171 A | | 4/1990 | Zweig ......................... 526/246 |
| 4,943,364 A | | 7/1990 | Koch et al. ................... 204/415 |
| 5,075,106 A | * | 12/1991 | Goldenberg ................. 526/247 |
| 5,085,888 A | | 2/1992 | Morimoto et al. ........... 427/108 |
| 5,114,676 A | * | 5/1992 | Leiner et al. ............. 422/82.06 |
| 5,115,801 A | | 5/1992 | Cartmell et al. ............... 602/48 |
| 5,254,392 A | | 10/1993 | Burns et al. .................. 428/212 |
| 5,296,305 A | * | 3/1994 | Baude et al. ................. 428/520 |
| 5,436,161 A | * | 7/1995 | Bergstrom et al. .......... 435/291 |
| 5,644,124 A | | 7/1997 | Hamada et al. .............. 250/216 |
| 5,853,669 A | * | 12/1998 | Wolfbeis .................. 422/82.05 |
| 5,882,773 A | | 3/1999 | Chow et al. .................. 428/212 |
| 5,973,450 A | | 10/1999 | Nishizawa et al. .......... 313/478 |
| 6,040,493 A | * | 3/2000 | Cooke et al. .................. 602/41 |
| 6,064,524 A | | 5/2000 | Oka et al. .................... 359/582 |
| 6,156,478 A | * | 12/2000 | Liu et al. .................. 430/270.1 |
| 6,306,922 B1 | * | 10/2001 | Hubbell et al. ................ 522/71 |
| 6,341,185 B1 | | 1/2002 | Elstere et al. ................. 385/12 |

FOREIGN PATENT DOCUMENTS

| GB | 1404378 | * | 8/1975 |
|---|---|---|---|
| GB | 1496345 | * | 12/1977 |
| GB | 2196973 A | | 5/1988 |
| WO | 00/14131 | | 3/2000 |

* cited by examiner

*Primary Examiner*—Helen L. Pezzuto
(74) *Attorney, Agent, or Firm*—Renner, Otto, Boisselle & Sklar, LLP

(57) ABSTRACT

A transparent and low refractive index optical coating for use in light transmitting electronic devices is disclosed. The optical coating comprises a hydrogel having a refractive index of less than 1.40.

15 Claims, No Drawings

OPTICAL COATING HAVING LOW REFRACTIVE INDEX

This application claims the benefit of Provisional Application No. 60/245,326, which is hereby incorporated by reference herein in its entirety filed Nov. 1, 2000.

FIELD OF THE INVENTION

The present invention is directed to transparent and low refractive index optical coatings for use in light transmitting electronic devices. In particular, the present invention is directed to low refractive index optical coatings manufactured from hydrogels.

BACKGROUND OF THE INVENTION

By definition, a hydrogel is a polymeric material which exhibits the ability to swell in water and retain a significant fraction, (e.g., greater than 20%) of water within its structure, but which will not dissolve in water. The hydrogel forms an equilibrium state with water, and maintains its equilibrium shape. Included in this definition are a wide variety of natural materials of both plant and animal origin, materials prepared by modifying naturally occurring structures, and synthetic polymeric materials.

Synthetic hydrogels include polyacrylic acid, polyvinyl pyrrolidone, polyvinyl alcohol, polyacrylamide, polyhydroxybutyl acrylate and methacrylate, polyhydroxyethyl acrylate and methacrylate, polyethylene oxide and polyurethane. Hydrogels with various equilibrium content of water are known and used for manufacturing soft contact lenses and for medical applications such as wound dressings and adhesives for biomedical electrodes.

U.S. Pat. No. 2,976,576 describes the use of poly 2-hydroxyethyl methacrylate resin for contact lenses and body implants.

U.S. Pat. No. 3,419,006 describes the use of crosslinked poly(ethylene oxide) gels for wound dressings.

U.S. Pat. No. 3,963,685 describes the preparation of methanol soluble poly 2-hydroxyethyl methacrylate for wound care dressings using high purity 2-hydroxyethyl methacrylate monomer having not over 0.035 weight percent of alkylene glycol dimethacrylate impurities.

U.S. Pat. No. 3,963,805 describes a process for producing water swellable polyalkylene oxide wherein a mixture of polyethylene oxide and acrylic acid in a hydrocarbon solvent is heated.

U.S. Pat. No. 4,258,715 describes the use of a radiation crosslinked acrylamide polymer composition for sealing ostomy appliances.

GB 2196973 describes a hydrophilic copolymer useful for contact lenses and medical purposes. The hydrophilic copolymer is prepared by the copolymerization of a monomer mixture of 2-hydroxyethyl methacrylate and 2-(2-hydroxyethoxy)ethyl methacrylate with the free methacrylic acid or acrylic acid or their sodium, potassium and ammonium salts in the presence of radical initiators, and a crosslinking agent having at least two olefinic double bonds.

U.S. Pat. No. 5,115,801 describes a hydrogel burn dressing product in which the hydrogel material comprises from about 15% to about 30% by weight of a polyhedric alcohol, from about 8% to about 14% by weight of an isophorone diisocyanate terminated prepolymer, from about 5% to about 10% by weight of a polyethylene oxide based diamine, up to about 1% by weight of a salt, and the balance water.

WO 00/14131 describes a photopolymerizable composition useful in the production of wound dressings, electrodes for application to human or animal bodies or transdermal patches. The composition comprises a first monomer having olefinic unsaturation and a flexible hydrophilic chain, a second monomer having olefinic unsaturation and high polymerization efficiency and which can contribute to tackiness on curing, a crosslinking agent and a photoinitiator.

The present invention is directed to providing a transparent optical coating having a refractive index of less than about 1.40. The present invention is further directed to a method of providing a hydrogel coating having a refractive index of less than about 1.40 and an equilibrium water content of at least 50%.

SUMMARY OF THE INVENTION

A transparent optical coating is provided which comprises a hydrogel having a refractive index of less than 1.40 and an equilibrium water content of at least about 50 wt. %. A method for producing the optical coating is further provided whereby the hydrogel is made by the process comprising polymerizing in water, (a) a first oligomer of the formula

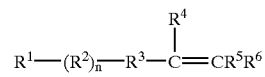

wherein $R^1$ is a hydroxyl or $C_1$–$C_4$ alkoxy; $R^2$ is a $C_2$–$C_4$ alkoxy; $R^3$ is —O— or —CO—; $R^4$, $R^5$ and $R^6$ are independently hydrogen, or $C_1$–$C_4$ alkyl; and n is 1–25; with (b) a second oligomer of the formula

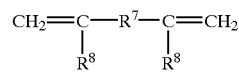

wherein $R^8$ is H or $CH_3$ and $R^7$ is a polar linking group and is water soluble; and initiating polymerization by irradiation or a free radical initiator.

An electronic device is also provided which comprises (a) two light transmitting substrates, each substrate having an inner surface; and (b) a transparent hydrogel coating positioned between said two substrates and conforming to the inner surface of each substrate; wherein the hydrogel coating has a refractive index of less than 1.4.

DETAILED DESCRIPTION OF THE INVENTION

The hydrogel coatings of the present invention are generally obtained by polymerizing hydrophilic, water soluble oligomers in the presence of water. The equilibrium content of water for the hydrogels of the present invention is at least about 50 wt. %. In one embodiment, the equilibrium content of water of the hydrogel is at least about 75 wt. %. In another embodiment, the equilibrium content of water of the hydrogel is at least about 80 wt. %. In yet another embodiment, the equilibrium content of water of the hydrogel is at least about 90 wt. %. The refractive index for the hydrogel coatings of the present invention is less than about 1.4. In one embodiment, the refractive index is less than about 1.35.

The hydrogel coatings of the present invention can be used in light transmitting electronic devices, for example in the screens for computer monitors, computer laptops, televisions, cellular phones and video displays. The hydrogel coating is positioned between two light transmitting substrates and conforms to the inner surface of each substrate. The inner surface of each substrate may be smooth or may be textured or irregular.

The hydrogels can be formed by polymerization of a large variety of water soluble monomers in the presence of difunctional crosslinking agents by free radical polymerization and by crosslinking of water-soluble oligomers in the presence of difunctional crosslinking agents by free radical polymerization or step-reaction polymerization. Crosslinking of previously formed water soluble polymers can also be effected by complexation with difunctional species, such as difunctional organic reactants or by exposure to ionizing radiation such as gamma rays or electron beam radiation. Many naturally occurring polymers such as gelatin can be reversibly and non-covalently crosslinked by manipulating gelation temperatures.

Examples of water-soluble monomers subject to free radical polymerization for use as a hydrogel are acrylic acid, hydroxyethyl methacrylate, acrylamide, methacrylamide, and vinyl pyrrolidone. Diacrylate esters of polyethylene oxide are typical free radical crosslinking agents used in these compositions. Examples of water-soluble oligomers subject to free radical polymerization for use as hydrogels are methoxypolyethyleneglycol acrylate or polyethyleneglycol methacrylate with polyethyleneglycol diacrylate as the crosslinking agent by redox, ultraviolet radiation or ionizing radiation. An example of water-soluble oligomers subject to step-reaction polymerization is a mixture of polyethyleneglycol and polyethyleneglycol based diamine with diisocyanate terminated prepolymer as the crosslinking agent. Examples of hydrogel formation by the crosslinking of water-soluble polymers are the crosslinking of polyvinylpyrrolidone, polyvinyl alcohol, polyacrylamide and polyethylene oxide by ionizing radiation. Examples of naturally occurring polymers which form gels by thermal gelation are gelatin and karaya gum.

In one embodiment of the present invention, the hydrogel is made of a polymer formed by polymerizing in water a soluble long chain oligomer having one olefinic group and a long chain oligomer having two olefinic groups. The first oligomer is a polyoxyalkylene chain connected to an ethylene or other alkylene group. This oligomer is of the formula:

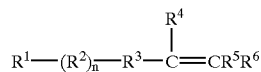

in which $R^1$ is a hydroxyl or $C_1$–$C_4$ alkoxy; $R^2$ is a $C_2$–$C_4$ alkoxy; $R^3$ is —O— or —CO—; $R^4$, $R^5$ and $R^6$ are independently hydrogen, or $C_1$–$C_4$ alkyl; and n is 1–25.

The polyoxyalkylene chain may be a polyethylene glycol chain that may contain minor amounts of polypropylene glycol or other units that do not interfere with its hydrophillic character. In one embodiment, $R^1$ represents methoxy- or ethoxy-, $R^2$ represents ethoxy-, $R^3$ represents —CO—, $R^4$ represents methyl and $R^5$ and $R^6$ represent hydrogen. In one embodiment n is 5–10. Examples of the first oligomer include:

$$CH_3CH_2O(CH_2CH_2O)_nCOC(CH_3)=CH_2$$

$$CH_3O(CH_2CH_2O)_nCOC(CH_3)=CH_2$$

$$HO(CH_2CH_2O)_nCOC(CH_3)=CH_2$$

wherein n is 1–25.

The second oligomer is represented by the formula:

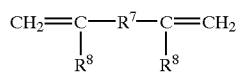

wherein $R^8$ represents H or $CH_3$ and $R^7$ represents a polar linking group and is water soluble. $R^7$ can be selected to provide the desired combination of properties of water absorption and water insolubility. Examples of polar linking groups are ether, ester, amide, urethane and urea groups, suitable oligomers are water-soluble or water miscible diolefinic acrylates or methacrylates, such as $$CH_2=CH(CH_3)—CO—O—CH_2—CH_2—O—COCH(CH_3)=CH_2$$

$$CH_2=CH—CO—NH—CH_2—NH—CO—CH=CH_2$$

$$CH_2=C(CH_3)—CO—O—(CH_2CH_2O)_n—O—CO—C(CH_3)=CH_2$$

wherein n is an integer. In one embodiment, n is between 5 and 15.

Useful hydrogels may be made by combining the first oligomer with the second oligomer in the presence of water and polymerizing the mixture. In one embodiment, the first oligomer is added in an amount within the range of about 0 to about 60 weight percent, and the second oligomer is added in an amount within the range of about 40 to about 100 weight percent, based on the total weight of oligomers. In another embodiment, the first oligomer is added in an amount within the range of about 10 to about 60 weight percent, and the second oligomer is added in an amount within the range of about 40 to about 90 weight percent, based on the total weight of oligomers.

Polymerization may be induced by free radical initiation. Typical free radical initiators include azo compounds such as 4,4'-azobis(4-cyanovaleric acid), peroxides such as hydrogen peroxide and t-butyl hydroperoxide, peroxocarbonates, persulfates such as ammonium persulfate, potassium persulfate and sodium persulfate, photoinitators based on benzoin ethers and their derivatives, and also redox initiators including persulfates with bisulfate, such as sodium persulfate with sodium metabisulfite, hydrogen peroxide with ferrous ion, sulfite ion, bisulfite ion or ascorbic acid, and hydroperoxides with sulfoxylates, such as t-butyl hydroperoxide with sodium formaldehyde sulfoxylate. The concentration of the initiator is generally within the range of about 0.01% to about 3% by weight, based on the weight of the oligomers.

A surfactant may be added to the oligomer mixture in an amount from about 0 to about 5 wt. % based on the weight of the hydrogel polymer. Suitable surfactants include, but are not limited to, water dispersible silicone and fluorocarbon surfactants. In one embodiment, the surfactant is a polydimethylsiloxane polyethylene glycol copolymer added in an amount of about 0.5% by weight, based on the weight of the hydrogel polymer.

In another embodiment of the present invention, the hydrogel is a cross-linked polyalkylene oxide. Water swellable polyalkylene oxide can be produced by a process which comprises mixing polyethylene oxide having a molecular weight of at least 100,000, an inert hydrocarbon solvent containing a free radical catalyst and acrylic acid, and heating the reaction mixture for a time sufficient to produce the water swellable polyalkylene oxide. Useful free radical catalysts include azobisisobutyronitrile, benzoyl peroxide, acetyl peroxide and 2,4-dichlorobenzoyl peroxide. U.S. Pat. No. 3,963,805 to Union Carbide, incorporated herein by reference, describes this process for producing water swellable polyethylene oxide. Commercially available water swellable polyethylene oxides include POLYOX WSR-205 from Union Carbide and ALKOK from Meisei Chemical Works.

In another embodiment of the present invention, the hydrogel is a crosslinked polyacrylamide hydrogel. Polyacrylamide hydrogels may be produced, for example, by crosslinking polyacrylamide with methylene-bis-acrylamide crosslinking agent. A polymerization initiator, such as a mixture of ammonium persulfate and tetramethylene diamine or ammonium persulfate and ammonium sulfate may be used. A commercially available polyacrylamide hydrogel is POLYFLOC AP1142 from BetzDearborn, a division of Hercules Inc.

In one embodiment of the present invention, the hydrogel coating has a dynamic storage shear modulus (G=) of between about $1 \times 10^2$ dynes/cm$^2$ to about $3 \times 10^5$ dynes/cm$^2$ at a frequency of 1.0 rad/sec. In another embodiment, the hydrogel coating has a storage shear modulus of between about $5 \times 10^2$ dynes/cm$^2$ to about $1 \times 10^5$ dynes/cm$^2$ at a frequency of 1.0 rad/sec. The dynamic storage shear modulus is a measure of the hardness of the hydrogel at the frequency of measurement. The higher the dynamic storage shear modulus (G=), the harder the hydrogel. In one embodiment of the present invention, the hydrogel coating has a viscoelastic dissipation index (tan d) between about 0.001 to about 0.5 at a frequency of 1.0 rad/sec. In another embodiment, the hydrogel coating a viscoelastic index between about 0.01 to about 0.2 at a frequency of 1.0 rad/sec. The viscoelastic index is a measure of the elasticity of the hydrogel at the frequency of measuement. The lower the viscoelastic index, the more elastic the hydrogel.

The following examples illustrate methods of preparing the hydrogels of the present invention.

EXAMPLE 1

A mixture consisting of 1.0 gram of polyethyleneglycol (9) diacrylate and 1.0 gram of methoxypolyethyleneglycol (9) acrylate was polymerized with 0.25 wt. % sodium persulfate and 0.25 wt. % of sodium metabisulfite (by weight of the monomers) in 38.0 grams of deionized water for about 16 hours at ambient temperature. The resulting hydrogel after swelling contains 93.5 wt. % of water and has a refractive index of 1.3388.

EXAMPLE 2

A mixture consisting of 2.0 grams of polyethyleneglycol (9) diacrylate and 2.0 grams of methoxypolyethyleneglycol (9) acrylate was polymerized with 0.15 wt. % sodium persulfate and 0.15 wt. % of sodium metabisulfite (by weight of the monomers) in 36.0 grams of deionized water for about 16 hours at ambient temperature. The resulting hydrogel after swelling contains 89.6 wt. % of water and has a refractive index of 1.3455.

EXAMPLE 3

A mixture consisting of 3.0 grams of polyethyleneglycol (9) diacrylate and 3.0 grams of methoxypolyethyleneglycol (9) acrylate was polymerized with 0.15 wt. % sodium persulfate and 0.15 wt. % of sodium metabisulfite (by weight of the monomers) in 34.0 grams of deionized water for about 16 hours at ambient temperature. The resulting hydrogel after swelling contains 84.5 wt. % of water and has a refractive index of 1.3557.

EXAMPLE 4

A mixture consisting of 4.0 grams of polyethyleneglycol (9) diacrylate and 4.0 grams of methoxypolyethyleneglycol (9) acrylate was polymerized with 0.15 wt. % sodium persulfate and 0.15 wt. % of sodium metabisulfite (by weight of the monomers) in 32.0 grams of deionized water for about 16 hours at ambient temperature. The resulting hydrogel after swelling contains 80.1 wt. % of water and has a refractive index of 1.3602.

EXAMPLE 5

A mixture consisting of 5.0 grams of polyethyleneglycol (9) diacrylate and 5.0 grams of methoxypolyethyleneglycol (9) acrylate was polymerized with 0.15 wt. % sodium persulfate and 0.15 wt. % of sodium metabisulfite (by weight of the monomers) in 30.0 grams of deionized water for about 16 hours at ambient temperature. The resulting hydrogel after swelling contains 75.6 wt. % of water and has a refractive index of 1.3645.

EXAMPLE 6

A mixture consisting of 80 wt. % polyethyleneglycol (9) diacrylate and 20 wt. % methoxypolyethyleneglycol (9) acrylate was polymerized with 2.6 wt % of 2-hydroxy-2-methyl-1-phenyl-propane-1-one and 0.13 wt. % polydimethylsiloxane-polyethylene oxide copolymer (by weight of the monomers) in deionized water by irradi ting the mixture with 2 passes at 50 ft/mm under a Fusion Systems D-bulb at 850 milliJoules/cm$^2$. The resulting hydrogel after swelling contains 92.5 wt. % water and has refractive index of 1.3427.

EXAMPLES 7–16

Examples 7–16 were prepared substantially in accordance with the procedure of Example 6. Table I below sets forth the hydrogel composition and the equilibrium water content and refractive index for each example. All percentages are weight percentages.

TABLE I

| | Ex. | | | | | | | | | | |
|---|---|---|---|---|---|---|---|---|---|---|---|
| | 6 | 7 | 8 | 9 | 10 | 11 | 12 | 13 | 14 | 15 | 16 |
| oligomer 2 | 80% | 80% | 80% | 80% | 40% | 40% | 100% | 50% | 50% | 50% | 50% |
| oligomer 1 | 20% | 20% | 20% | 20% | 60% | 60% | 0 | 50% | 50% | 50% | 50% |
| initiator | 2.6% | 3.0% | 3.3% | 3.0% | 3.75% | 3.0% | 3.0% | 3.0% | 3.0% | 3.0% | 3.0% |
| surfactant | 0.13% | 0.2% | 0.13% | 0.15% | 0.1% | 0.6% | 0.3% | 0.6% | 0.6% | 0.6% | 0.6% |
| water content | 92.5% | 90% | 85% | 80% | 60% | 50% | 94.7% | 90% | 80% | 60% | 40% |
| refractive index | 1.3427 | 1.3466 | 1.3543 | 1.3625 | 1.3933 | 1.4136 | 1.3399 | 1.3452 | 1.3607 | 1.3919 | 1.4237 |

Oligomer 2 = polyethylene glycol (9) diacrylate
Oligomer 1 = methoxypolyethylene glycol (9) acrylate
initator = 2-hydroxy-2-methyl-1-phenyl-propan-1-one
surfactant = polydimethylsiloxane-polyethyleneoxide

EXAMPLE 17

A mixture consisting of 52 wt. % polyethyleneglycol (13) dimethacrylate and 48 wt. % polyethyleneglycol (10) methacrylate was polymerized in deionized water by irradiating the mixture at 31.3–34.6 kGy gamma radiation. The resulting hydrogel after swelling contains 94.1 wt. % water and has a refractive index of 1.3372.

EXAMPLE 18

A mixture consisting of 71 wt. % polyethyleneglycol (13) dimethacrylate and 29 wt. % polyethyleneglycol (10) methacrylate was polymerized in deionized water by irradiating the mixture at 31.3–34.6 kGy gamma radiation. The resulting hydrogel after swelling contains 93.8 wt. % water and has a refractive index of 1.3335.

The rheological properties and light transmission of several hydrogels of the present invention are listed below in Table II. Light transmission was measured by placing a 3 mil thick sample of the hydrogel between two glass plates. This measurement was compared to the light transmission of the two glass plates without the hydrogel. The difference between the light transmission measurements is presented in Table II as percentage of light transmitted by the hydrogel-free glass plates.

TABLE II

| Example | water content | G = at 1.0 rad/sec | tan d at 1 rad/sec | refractive index | % light transmission |
|---|---|---|---|---|---|
| 16 | 40 wt. % | $3.30 \times 10^5$ | 1.6 | 1.4237 | 93.8% |
| 15 | 60 wt. % | $2.70 \times 10^5$ | 1.4 | 1.3919 | 97.6% |
| 14 | 80 wt. % | $2.70 \times 10^5$ | 0.19 | 1.3607 | 100% |
| 13 | 90 wt. % | $4.50 \times 10^3$ | 0.028 | 1.3452 | 100% |
| 12 | 95 wt. % | $5.5 \times 10^2$ | 0.06 | 1.3399 | 100% |

G = dynamic storage shear modulus, dynes/cm$^2$ (Method E of ASTM D-4065-82)
tan d = viscoelastic index

EXAMPLES 19–23

Polyacrylamide hydrogels were formed by mixing POLY-FLOC AP1142 with water in the amounts shown in Table III below, and then gamma irradiated. The amounts listed below are in percent by weight.

EXAMPLES 24–27

Polyethylene oxide hydrogels were formed by mixing POLYOX WSR 205 with water in the amounts shown in Table III below, and then gamma irradiated. The amounts listed below are in percent by weight.

TABLE III

| | Example | | | | | | | | |
|---|---|---|---|---|---|---|---|---|---|
| | 19 | 20 | 21 | 22 | 23 | 24 | 25 | 26 | 27 |
| polyacrylamide | 5 | 10 | 15 | 20 | 25 | — | — | — | — |
| polyethylene oxide | — | — | — | — | — | 5 | 10 | 15 | 20 |
| water content | 95 | 90 | 85 | 80 | 75 | 95 | 90 | 85 | 80 |
| nature of gel | ok | ok | chunky | chunky | chunky | solution | weak gel | chunky | chunky |
| refractive index | 1.338 | 1.347 | 1.356 | 1.368 | 1.380 | 1.339 | 1.346 | 1.352 | 1.356 |

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

We claim:

1. A transparent optical coating comprising a hydrogel having a refractive index of less than 1.40, a dynamic shear modulus of about $1\times10^2$ dynes/cm$^2$ to about $3\times10^5$ dynes/cm$^2$ at a frequency of 1.0 rad/second and an equilibrium water content of at least about 50 wt. %.

2. The transparent optical coating of claim 1 wherein said hydrogel has a refractive index of less than about 1.35.

3. The transparent optical coating of claim 1 wherein said hydrogel has an equilibrium water content of at least about 75 wt. %.

4. The transparent optical coating of claim 1 wherein said hydrogel has an equilibrium water content of at least about 90 wt. %.

5. The transparent optical coating of claim 1 wherein said hydrogel comprises a polyacrylamide.

6. The transparent optical coating of claim 1 wherein said hydrogel comprises a polyethylene oxide.

7. The transparent optical coating of claim 1 wherein said hydrogel is made by the process comprising polymerizing in water, (a) optionally, a first oligomer of the formula

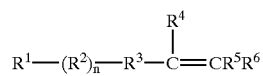

wherein R$^1$ is a hydroxyl or C$_1$–C$_4$ alkoxy; R$^2$ is a C$_2$–C$_4$ alkoxy; R$^3$ is —O— or —CO—; R$^4$, R$^5$ and R$^6$ are independently hydrogen, or C$_1$–C$_4$ alkyl; and n is 1–25; with (b) a second oligomer of the formula

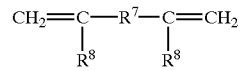

wherein R$^8$ is H or CH$_3$ and R$^7$ is a polar linking group and is water soluble; and initiating polymerization by irradiation or a free radical initiator.

8. The transparent optical coating of claim 7 wherein the first monomer is present in an amount within the range of about 0 to about 60 weight percent and the second monomer is present in an amount within the range of about 40 to about 100 weight percent.

9. The transparent optical coating of claim 7 wherein the first oligomer is methoxypolyethyleneglycol acrylate.

10. The transparent optical coating of claim 7 wherein the first oligomer is polyethyleneglycol methacrylate.

11. The transparent optical coating of claim 7 wherein the second oligomer is polyethyleneglycol diacrylate.

12. The transparent optical coating of claim 7 wherein the polymerization is initiated by gamma irradiation.

13. The transparent optical coating of claim 7 wherein the polymerization is initiated by ultra-violet irradiation.

14. The transparent optical coating of claim 13 wherein the photopolymerization is initiated by 2-hydroxy-2-methyl-1-phenyl-propane-1-one.

15. The transparent optical coating of claim 7 wherein the first monomer is present in an amount within the range of about 10 to about 60 weight percent and the second monomer is present in an amount within the range of about 40 to about 90 weight percent.

* * * * *